United States Patent
Parker

(10) Patent No.: US 6,202,280 B1
(45) Date of Patent: Mar. 20, 2001

(54) COVER-PLATE EXPANSION ASSEMBLY METHOD

(75) Inventor: Glen C. Parker, St. Peters, MO (US)

(73) Assignee: Federal-Mogul Corporation, St. Louis, MO (US)

( * ) Notice: Subject to any disclaimer, the term of this patent is extended or adjusted under 35 U.S.C. 154(b) by 0 days.

(21) Appl. No.: 09/167,917

(22) Filed: Oct. 7, 1998

(51) Int. Cl.[7] ........................................... B23P 11/00
(52) U.S. Cl. .................. 29/441.1; 29/522.1; 29/898.051
(58) Field of Search .................. 29/707, 522.1, 29/898.051, 441.1

(56) References Cited

U.S. PATENT DOCUMENTS

| | | |
|---|---|---|
| 1,507,840 | 9/1924 | Landgraf . |
| 3,055,086 | 9/1962 | Hoganson . |
| 3,857,149 * | 12/1974 | Hassan . |
| 3,958,411 * | 5/1976 | Bernt . |
| 4,070,121 * | 1/1978 | Graham . |
| 4,163,617 | 8/1979 | Nemoto . |
| 4,389,766 * | 6/1983 | Capuano . |
| 4,478,531 * | 10/1984 | Levivson et al. . |
| 4,569,126 * | 2/1986 | Weber . |
| 4,710,037 | 12/1987 | Newberg . |
| 4,749,299 * | 6/1988 | Swanson . |
| 4,823,454 * | 4/1989 | Mills . |
| 4,875,794 * | 10/1989 | Kern . |
| 5,885,022 * | 3/1999 | Maughau et al. . |
| 6,125,541 * | 10/2000 | Parker .............................. 29/898.051 |

* cited by examiner

Primary Examiner—S. Thomas Hughes
Assistant Examiner—Steve Blount
(74) Attorney, Agent, or Firm—Polster, Lieder, Woodruff & Lucchesi, L.C.

(57) ABSTRACT

An assembly technique for closing a movable socket (10) without the need to deform or displace any portion of the socket housing (12), thereby allowing for the use of fully hardened socket housing materials. The internal components of the movable socket are installed within the housing through an opening (16), and a conical cover-plate (66) is positioned over the components, within the opening. An assembly tool (100) configured to exert pressure on the conical cover-plate is brought into engagement with the plate, and a downward load is applied, expanding the plate to seat within a circumferential groove (22) in the housing. The assembly tool includes a specifically contoured face (109) which alters the angle at which pressure is exerted against the expanding conical cover-plate as the plate deforms to a generally planar configuration, closing the opening in the housing. Once expanded, the cover-plate seats within the groove formed in the interior surface of the housing, thereby securing the internal components within the housing.

7 Claims, 6 Drawing Sheets

COVER-PLATE EXPANSION ASSEMBLY METHOD

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates to the manufacturing and assembly of movable sockets, for example, ball joints as used in automotive steering and suspension systems, and more particularly, to a method and device for closing one end of a movable socket without spinning, swaging, or welding, by means of an expanding cover-plate. While the invention is described in detail with respect to automotive applications, those skilled in the art will recognized the broader applicability of the invention.

Conventional ball joints, and other movable sockets are used, for example, in automotive steering and suspension applications. The sockets comprise a housing having a circular cylindrical internal surface, a ball stud with a ball head contained in the housing, and a synthetic resin or sintered alloy bearing member supporting the ball head within the housing. These components are installed into the housing through a posterior opening, with the ball stud extending outward through an axially disposed anterior opening of a smaller diameter than the ball head. Traditionally, the posterior opening is closed by means of a cover-plate, spun, swaged, or welded in place. Once secured in place, the cover-plate presses on the bearing member either directly or indirectly through a resilient rubber intermediate component.

Bearing components within the housing, against which the ball head or moveable component is articulated, perform best when the housing material is fully hardened, as it is better able to withstand the stresses and frictional wear associated with movement of the bearing components. Accordingly, the use of hardened materials greatly extends the useful life of the bearing components and the housing. However, hardened material surfaces greatly hinder traditional spinning, sagging, or welding operations required to enclose the housing. Therefore, specialized heat treatment operations such as induction draw operations, or a reduction in the allowable hardness levels of the housing and bearing material surfaces must be employed when using traditional assembly methods. These options are utilized to prevent the housing from cracking during swaging or spinning operations. Welding is an alternative to swaging or spinning operations for securing the cover to the housing. However, welding hardened materials is a difficult and costly operation, and not commonly employed.

Accordingly, it is highly advantageous to develop an assembly method and associated components capable of enclosing a fully hardened housing without the need for specialized spinning, swaging, or welding operations.

BRIEF SUMMARY OF THE INVENTION

Among the several objects and advantages of the present invention are:

The provision of an assembly method for a movable socket employing an expanding cover-element to secure the socket components within a socket housing;

The provision of the aforementioned assembly method wherein the socket housing is fully hardened;

The provision of the aforementioned assembly method wherein the socket housing includes a counterbore adjacent the posterior opening, and an expanding cover-plate is seated on the counterbore prior to expansion;

The provision of the aforementioned assembly method wherein the expanding cover-element is expanded in-place by the application of direct pressure;

The provision of the aforementioned assembly method wherein direct pressure is applied to the expanding cover-element by means of a ram;

The provision of the aforementioned assembly method wherein the ram face is configured to alter the angle of applied pressure exerted on the expanding cover-element during the expansion process;

The provision of the aforementioned assembly method wherein the expanding cover-element deforms from a conic or convex shape to a generally planar configuration during the expansion process; and The provision of the aforementioned assembly method wherein no deformation or displacement of the housing material is required during assembly, allowing for an increase in material hardness, extending the useful service life of the movable socket.

Briefly stated, the present invention features an assembly technique for closing a movable socket without the need to deform or displace the portion of the socket housing, thereby allowing for the use of fully hardened materials for the socket housing. During assembly, various internal components of the movable socket are installed within the housing through an opening, and a conical or convex cover-element, for example, is positioned over the components, within the opening. A ram or similar device configured to exert pressure on the cover-element is brought into engagement with the cover-element, and a downward force applied, expanding the element. A specifically contoured face on the ram alters the angle at which pressure is exerted against the expanding cover-element as the plate deforms to close the opening in the housing, ensuring a generally planar final configuration. Once expanded, the cover-element is retained within a groove formed in the interior surface of the housing, thereby securing the various internal components within the housing.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what we presently believe is the best mode of carrying out the invention.

Figure 1:
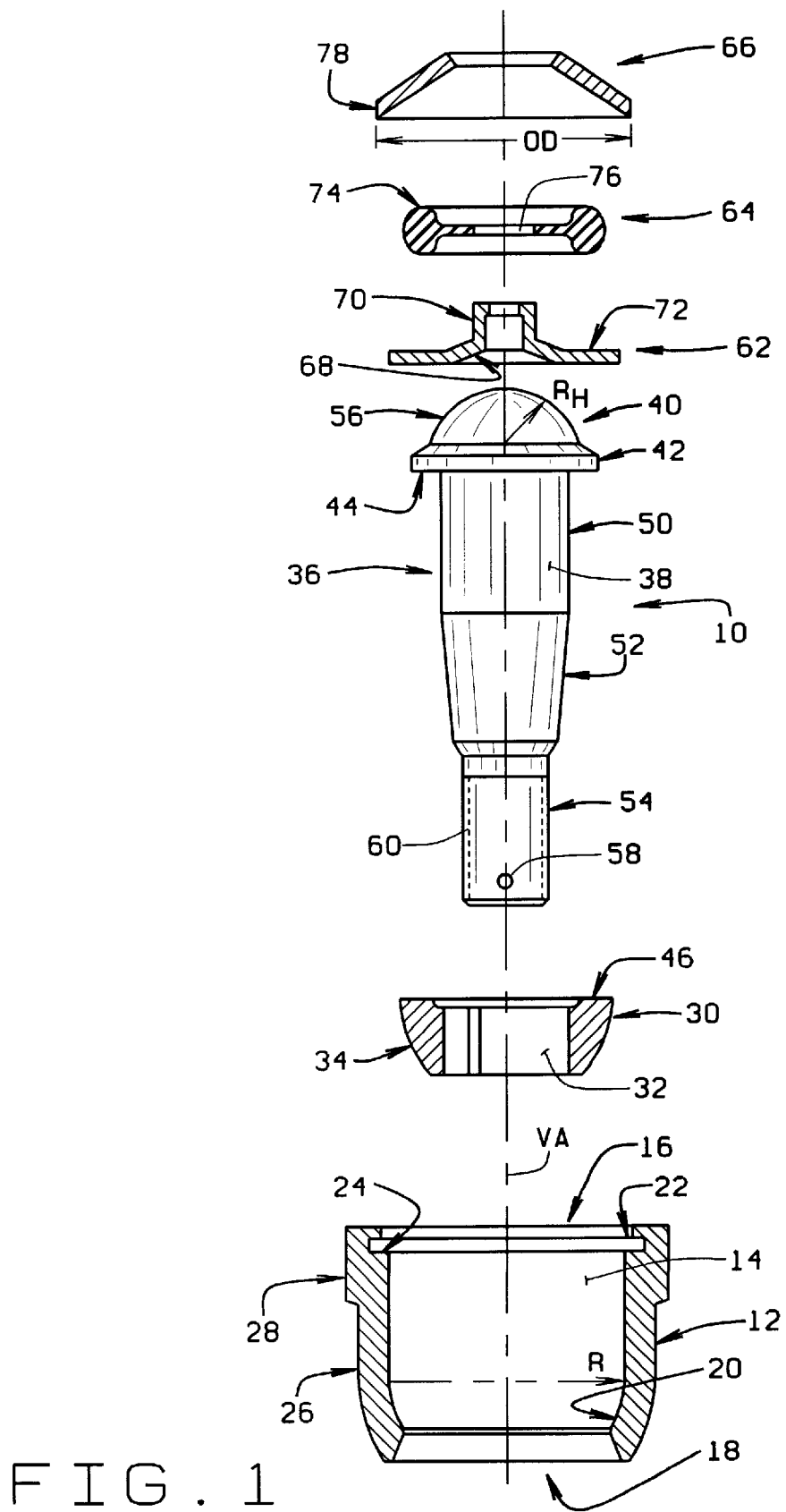
FIG. 1 is an exploded view of one illustrative embodiment of a movable socket assembly employing one embodiment of an expanding cover-plate of the present invention.

Referring generally to FIG. 1, the expanding cover-plate assembly method of the present invention may be used to enclose a movable socket, such as the ball joint shown at 10, within a housing 12 without the need for spinning, swaging, or welding. Those skilled in the art will readily recognize the applicability of the following method to the assembly of a variety of different movable sockets including those having only one housing opening; to facilitate the description of the method and devices used in conjunction therewith, the preferred embodiment of present invention is described in reference to an exemplary ball joint 10, but is not limited to use therewith.

Housing 12, within which the various internal components of the ball joint are enclosed, is generally cylindrical, with a central bore 14 of non-uniform radius having a posterior opening 16 and an anterior opening 18. The radius R of central bore 14 decreases to define a curved surface 20 at the base of the housing, adjacent anterior opening 18. A counterbore 22 having a circumferential groove 24 is formed in bore 14, adjacent the posterior opening 16. The exterior surface 26 of housing 12 may follow the general contour of the central bore 14. In the embodiment illustrated, the surface 26 has an expanded ridge 28 formed in it. The ridge 28 is used for attachment of ball joint 10 to other components (not shown). As may be appreciated, the ridge 28 also may be adapted for other specific kinds of installations employing threads or other connectors (not shown).

To assemble ball joint 10, a bearing 30 sized to fit within central bore 14 is seated within housing 12. The bearing 30 includes a central bore 32 axially aligned with a vertical axis VA of the housing, and a curved outer surface 34 of bearing 30 is designed to correspond to the curvature of surface 20 in housing 12.

Next, a stud 36 having a generally cylindrical body 38 and an enlarged head portion 40 with a circumferential flange 42 is passed through central bores 32 and 14, such that the underside 44 of flange 42 rests on an upper surface 46 of the bearing seated within the housing. The body 38 includes a uniform diameter upper portion 50 adjacent flange 42, a tapered central portion 52, and a lower portion 54 of a narrow uniform diameter. The upper portion 50 is sized to fit within the central bore 32 of bearing 30, with the central portion 52 and lower portion 54 extending through the anterior opening 18, externally of housing 12. The head portion 40 includes a hemispherical surface 56 with a radius RH greater than that of upper portion 50, but less than radius R of the housing 12. When assembled, the hemispherical surface 56 and the curved outer surface 34 define a generally spherical unit within housing 12, allowing for conical movement of stud 36. Those skilled in the art will readily recognize that numerous shapes and configurations for stud 36 and bearing 30 are possible. For example, the stud 36 may include a generally spherical head, eliminating the need for bearing 30, or the cylindrical body may include threads (not shown), bores as at 58, or grooves as at 60, for attachment of external components (not shown).

Once stud 36 and bearing 30 are seated within the housing, a pressure plate 62 and rubber cushion 64 are placed within central bore 14, above hemispherical surface 56, and secured therein by an expanding cover-plate 66 as described below. The pressure plate 62 sits on top of stud 36, and includes a curved indentation 68 having a radius of curvature corresponding to Rh. In the preferred embodiment, a lubrication port 70 is formed in and extends upward along the center of the pressure plate 62. Port 70 permits the injection of a lubricant into the interior spaces of the assembled ball joint 10. Rubber cushion 64 sits, in turn, on an upper surface 72 of pressure plate 62, and serves to hold the pressure plate 62 in place against the stud 36 while simultaneously permitting small movements in response to the conical movement of the stud. The rubber cushion includes an circumferential torus 74, having an axial hole 76 formed in it through which the lubrication port 70 extends. Finally, cover-plate 66, shown in an un-expanded conical configuration in FIG. 1, is placed above the rubber cushion 64 along counter-bore 22, for vertical compression and lateral expansion as will be described, to seat within circumferential groove 24 and enclose the various components within housing 12. To facilitate the insertion of the cover-plate 66 within the posterior opening of housing 12, the cover-plate 66 includes a circumferential rim 78 having an outer diameter OD sized to fit within counter-bore 22.

As indicated above, those skilled in the art will recognize that the various internal components of the moveable socket secured within the housing 12 by the cover plate 66 may be altered depending upon the particular application for which the movable socket is designed, and accordingly, the above described ball joint 10 is merely exemplary of one embodiment. The assembly method described below for installing the expanding cover-plate 66 is applicable to any movable socket wherein at least one end of the housing 12 must be enclosed to retain internal components in place. For example, a movable socket having only a single housing opening, through which the internal components are inserted and through which the stud lower portion 54 exits, may be enclosed by the method and device of the present invention, utilizing an expanding cover-ring disposed concentric to the stud, is considered within the scope of the invention.

Figure 2:
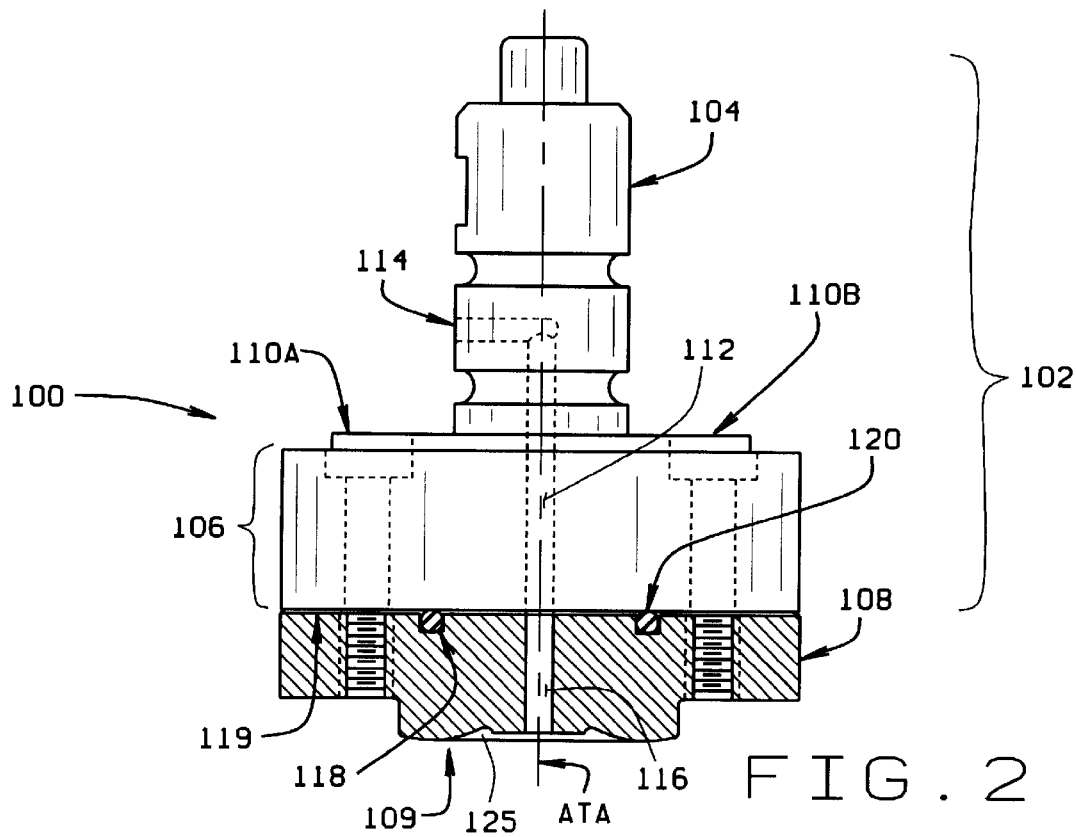
FIG. 2 is a partial sectional view of one illustrative embodiment of the ram of the present invention.

Turning now to FIG. 2, an assembly tool (ram) for use with expanding cover-plate 66 is shown generally at 100. The assembly tool 100 comprises a cap portion 102 having a shaft 104 adapted for attachment to the driving member of a hydraulic or pneumatic press (not shown) and a base portion 106. A removable stop-out plate 108 having a working face 109 is mounted to the base portion by a pair of threaded cap screws 110A and 110B. An axial bore 112 passes through the base portion and partially traverses the shaft, intersecting a radial bore 114 open to the exterior of the assembly tool. Included within stop-out plate 108 is an axial bore 116 aligned with axial bore 112, such that a lubricant injected into radial bore 114 will exit the assembly tool adjacent the working face. A circular groove 118 disposed radially outward from axial bore 116 in the upper face 119 of the stop-out plate receives an O-ring seal 120, preventing any lubricant escaping the intersection of axial bores 112 and 116 from reaching the threaded cap screws.

Figure 3:
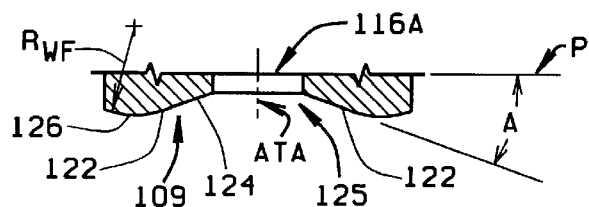
FIG. 3 is a sectional view of the face of a preferred embodiment of the ram, illustrating considerations in ram design.

Turning to FIG. 3, the working face 109 of an alternate embodiment to stop-out plate 108 having an enlarged axial bore 116A is shown. In the embodiment of FIG. 3, the working face 109 is defined by an outer surface 122 having a first portion 124 extending conically outward from a recessed area 125 adjacent assembly tool axis ATA, at an acute angle A relative to a plane P parallel to upper surface 119. The first portion 124 smoothly transitions into a second portion 126 of the outer surface 122, having a uniform curvature of radius RWF. In the embodiment shown in FIG. 3, angle A is 20°, and radius RWF is 0.500 inches, corresponding to the particular dimensions of one embodiment of expanding cover-plate 66 shown in FIG. 4.

Figure 4:
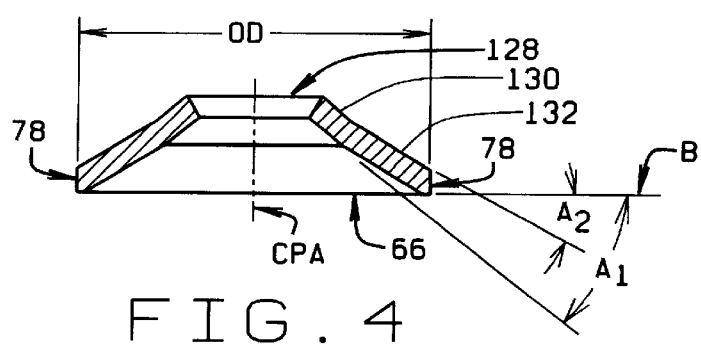
FIG. 4 is a sectional view of an expanding cover-plate of FIG. 1 prior to installation.

The preferred embodiment of the expanding cover-plate shown in FIG. 4 of the present invention is manufactured in the general form of a truncated hollow cone, having outer diameter OD as measured at base B. The expanding cover-plate 66 is open at base B, and has an opening 128 formed in it along an axis CPA, truncating the conical form. As with the working face 109, the conical sides of the expanding cover-plate 66 comprises two distinct portions. A first portion 130, adjacent the axial opening 128 is formed at a first acute angle $A_1$ with respect to base B. A second portion 132 is formed at a second acute angle $A_2$, as measured with respect to base B, such that $A_2$ is less than $A_1$.

The dimensions shown in FIGS. 3 and 4 are for the preferred embodiments of the expanding cover-plate 66 and the working face 109 of stop-out plate 108, and form a matching set. Upon reading the following assembly method description, those skilled in the art will readily recognize that expanding cover-plates of a variety of sizes and shapes may be manufactured, including those with and without an axial opening 128, and with more or fewer distinct conic surface portions, provided appropriate alterations are correspondingly made to working face 109. For example, an expanding cover-ring (not shown) through which a stud exits may be utilized within the scope of the invention to enclose an open end of a housing (not shown) having only one opening through which all internal components are loaded.

Figure 5:
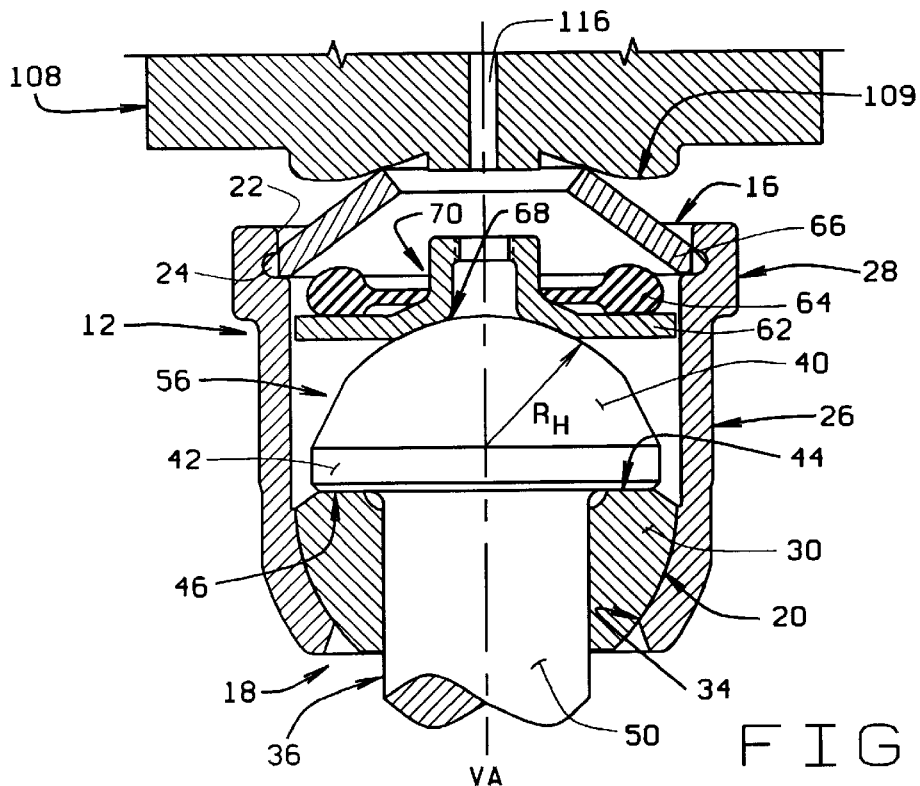
FIG. 5 is a sectional view is a sectional view of the assembled component prior to the expansion of the cover-plate.
Figure 7:
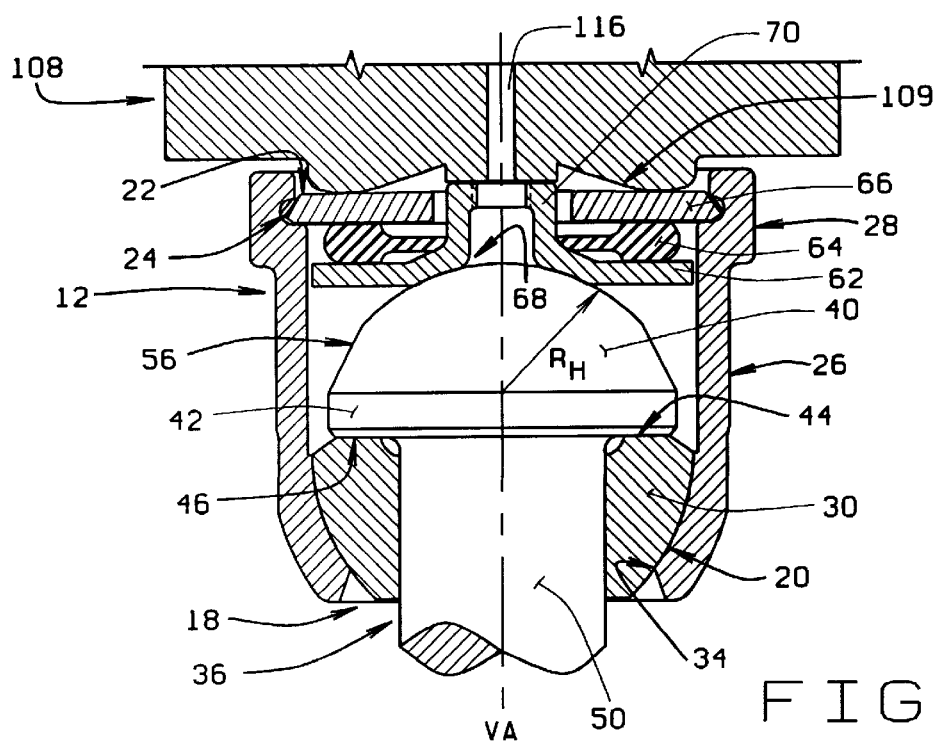
FIG. 7 is a sectional view similar to FIG. 5, illustrating the expanded cover-plate in place.
Figure 6A:
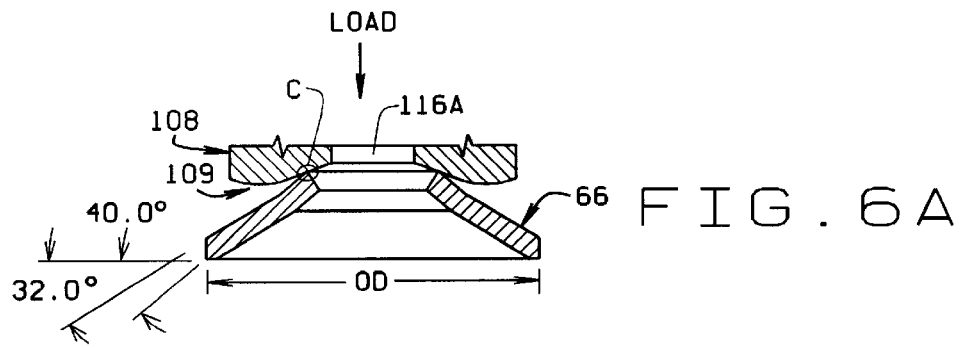
FIG. 6A–FIG. 6I are sectional views of the ram face in contact with the expanding cover-plate at various points throughout the driving operation, illustrating the variable contact points between the two components.
Figure 6B:
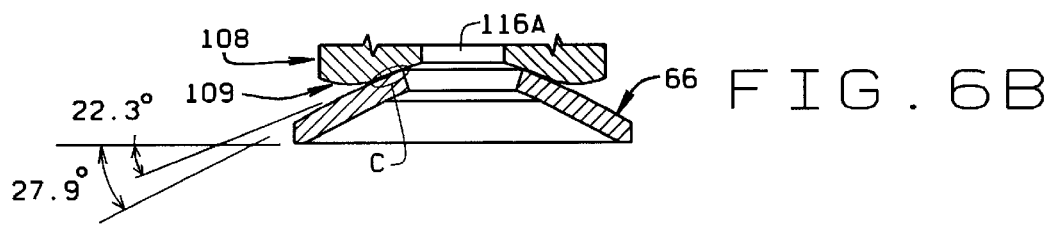
Figure 6C:
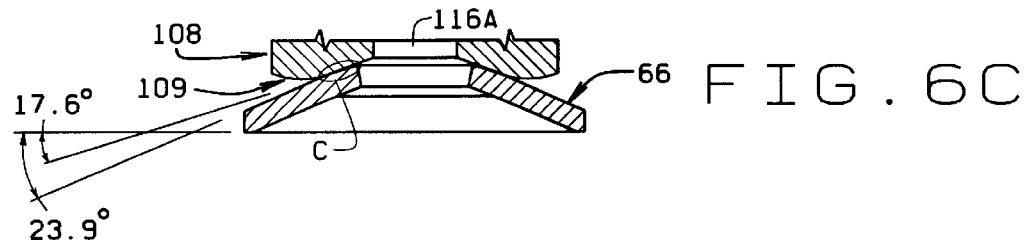
Figure 6D:
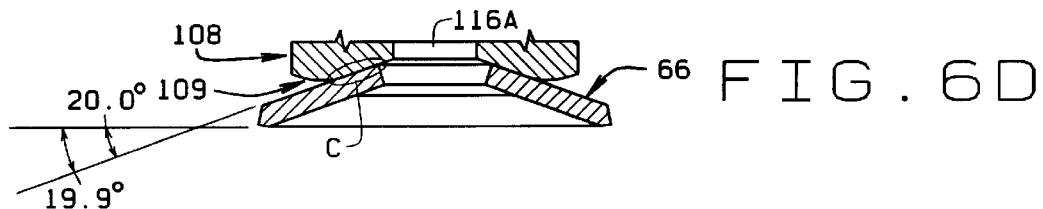
Figure 6E:
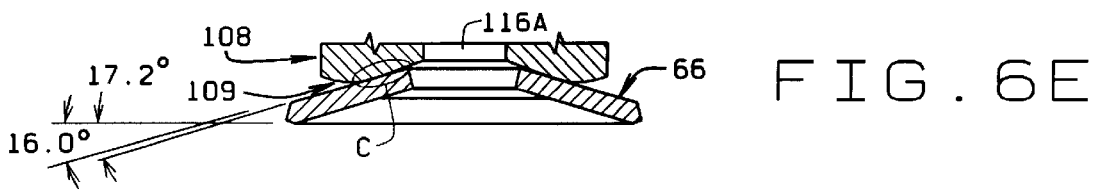
Figure 6F:
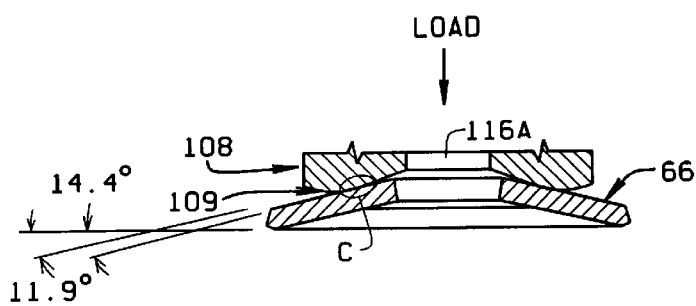
Figure 6G:
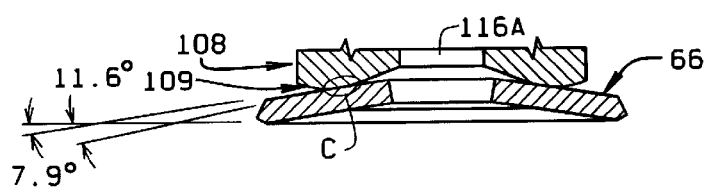
Figure 6H:
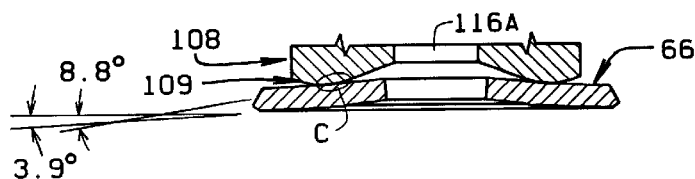
Figure 6I:
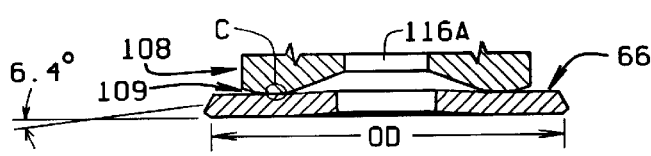

Turing now to FIG. 5 through FIG. 7, the assembly operation of ball joint 10 utilizing assembly tool 100, expanding cover-plate 66, and the method of the present invention is described. The internal components of the ball joint 10, including bearing 30, stud 36, pressure plate 62, and rubber cushion 64 are stacked within housing 12, and expanding cover-plate 66 is placed within posterior opening 16 on the shoulder of counterbore 22, radially adjacent groove 24. With all components axially aligned through their respective centerlines along vertical axis VA, assembly tool 100 is positioned such that working face 109 of the stop-out plate 108 contacts the upper surface of the expanding cover-plate (FIG. 5).

As shown in FIGS. 6A–6I, a load, preferably at least 7,500 pounds, is exerted on the expanding cover-plate 66 by the assembly tool 100, flattening the generally conical form into a generally planar form, and expanding the cover-plate 66 beyond outer diameter OD. Due to the specific configuration and interaction between the working face 109 and the expanding covers-plate plate 66, the circumferential contact region C between working face 109 and expanding cover-plate 66 shifts radially outward from vertical axis VA as the expanding cover-plate 66 deforms, continually transforming the vertical or axial load exerted by assembly tool 100 to an increasingly horizontal or radial expansion force, eliminating the tendency of the cover-plate 66 to cup or bow, and preventing excess vertical or axial loads on the internal components. Full expansion of the expanding cover-plate 66 is achieved when the working face 109 contacts lubrication port 70 of the pressure plate 62, and circumferential rim 78 of the cover-plate 66 is seated within circumferential groove 24 of the housing 12 (FIG. 7).

Figure 8:
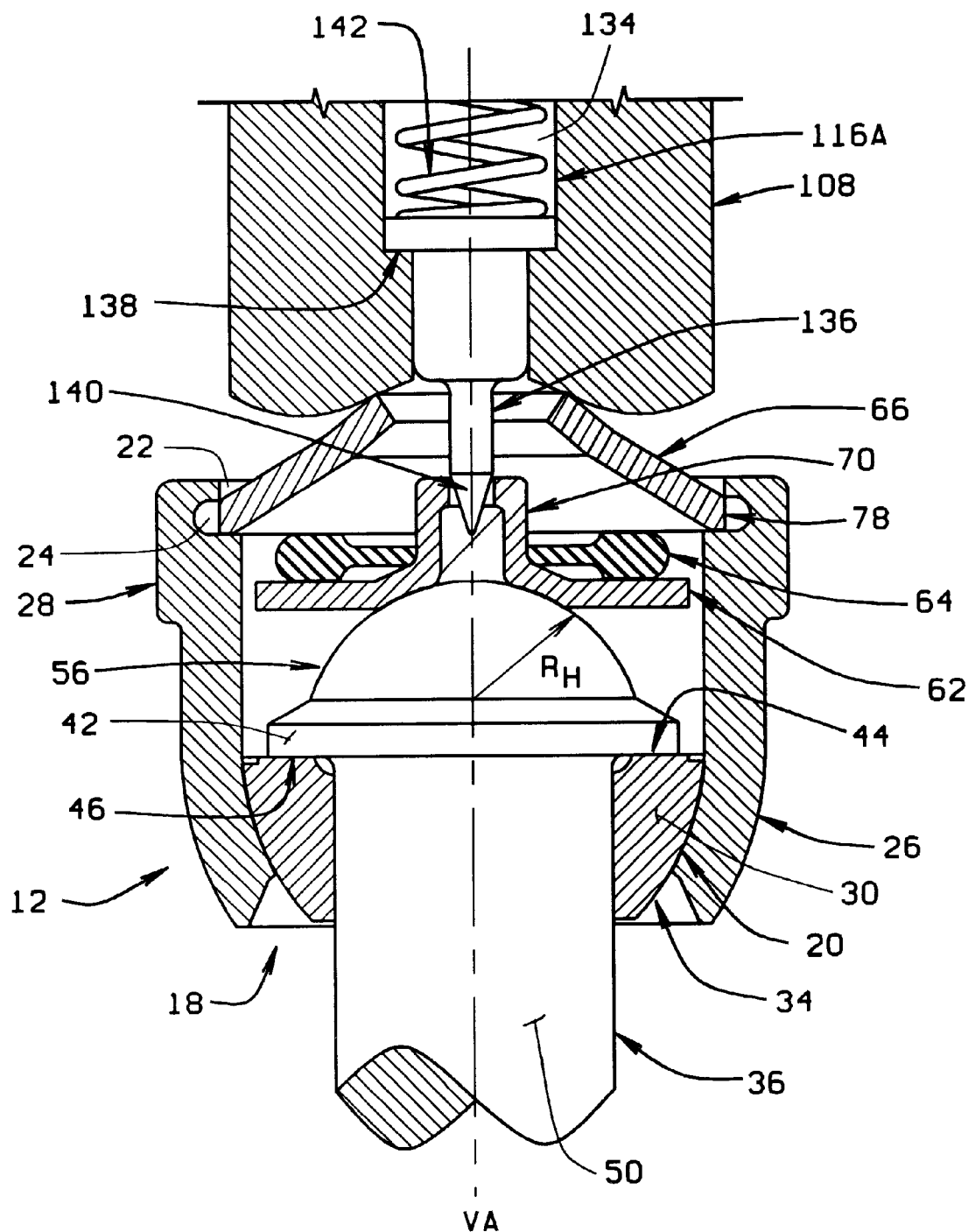
FIG. 8 is a section view similar to FIG. 5, of an alternate embodiment wherein the assembly tool incorporates a spring-loaded centering pin.

Those skilled in the art will readily recognize that the load required to fully expand the cover-plate 66 will vary with the type, size, and thickness of the material employed in forming the cover-plate 66, as will the specific angles shown in the preferred embodiment of FIGS. 6A–6I. Additional embodiments, such as shown in FIG. 8, may include an enlarged portion 134 in axial bore 116, allowing for the placement of a centering pin 136. Centering pin 136 is preferably seated against a shoulder 138 defined by portion 134 of the axial bore, and includes an centering shaft 140 extending external to the working face 109. During assembly of the movable socket 10 and expansion of the cover-plate 66, the centering shaft 140 seats within the axial opening of the lubrication port 70 in pressure plate 62, ensuring the pressure plate remains centered within the housing 12 during the expansion operation. As the assembly tool 100 depresses and expands the cover-plate 66, the tip of the centering shaft 140 will contact the hemispherical head 56 of the stud 36, and compress a retaining spring 142, allowing the centering pin 136 to retract within the assembly tool 100.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A method of forming a socket, the method comprising:
   providing a housing having a central bore, the central bore including at least one open end having a counterbore, and a circumferential groove formed along the counterbore;
   providing one or more joint components, including a stud;
   providing an expandable cover-element, said cover-element having an unexpanded outer diameter sized to seat along said counterbore;
   inserting said stud and joint components into said central bore;
   placing said cover-element over said joint components at said open end of the central bore, said cover-element seating on said counterbore, adjacent said inner circumferential groove;
   applying a load to said cover element, said load expanding said cover element into a substantially planar configuration seated in said inner circumferential groove over said joint components to secure said cover-element to said housing; and
   continually increasing a radial component and decreasing an axial component of said load as said cover-element expands enclosing said stud and joint components in said central bore.

2. The method of claim 1 wherein the cover-element includes a raised portion and expanding the cover-element comprises flattening the raised portion.

3. The method of claim 2 wherein the raised portion is cone-shaped.

4. The method of claim 2 wherein the raised portion is convex-shaped.

5. The method of claim 2 wherein expanding the cover-element includes the steps of:

engaging said cover-element with a ram, said ram including a working face configured to engage said cover-element; and applying force to said cover-element through said ram, the application of said force directed by said working face to flatten said cover-element.

6. The method of claim 5, further comprising placing a pressure plate between said joint components and said cover-element, wherein said cover-element includes a central opening and wherein said ram includes a centering pin extending through said central opening to center said pressure plate in said central bore.

7. The method of claim 6 wherein said centering pin is spring-loaded.

* * * * *